(12) United States Patent
LaGard

(10) Patent No.: US 11,505,053 B2
(45) Date of Patent: Nov. 22, 2022

(54) INFLATABLE CAMPER SKIRT ASSEMBLY

(71) Applicant: William LaGard, Oakdale, PA (US)

(72) Inventor: William LaGard, Oakdale, PA (US)

(*) Notice: Subject to any disclaimer, the term of this patent is extended or adjusted under 35 U.S.C. 154(b) by 163 days.

(21) Appl. No.: 17/154,604

(22) Filed: Jan. 21, 2021

(65) Prior Publication Data

US 2022/0227213 A1     Jul. 21, 2022

(51) Int. Cl.
*B60J 11/06* (2006.01)

(52) U.S. Cl.
CPC .................... *B60J 11/06* (2013.01)

(58) Field of Classification Search
CPC .. B60J 11/06; B60P 3/32; B60R 13/04; B62D 35/001; E04B 1/34342
USPC ............... 296/156, 180.4, 180.1; 52/169.12
See application file for complete search history.

(56) References Cited

U.S. PATENT DOCUMENTS

| | | | |
|---|---|---|---|
| 5,720,678 A * | 2/1998 | Korthauer | A63C 19/00 473/415 |
| 6,065,260 A | 5/2000 | Dickey | |
| 6,374,552 B1 | 4/2002 | Price | |
| 6,935,083 B2 | 8/2005 | Chezum | |
| 7,325,363 B2 | 2/2008 | Davis | |
| 8,393,643 B1 * | 3/2013 | Mace | B60P 3/36 280/768 |
| 10,000,147 B1 * | 6/2018 | Desrochers | B60J 11/02 |
| 2010/0199576 A1 | 8/2010 | Farrell | |
| 2016/0214660 A1 * | 7/2016 | Conny | B62D 35/001 |
| 2017/0096178 A1 * | 4/2017 | Wall, II | B62D 35/001 |

\* cited by examiner

*Primary Examiner* — Joseph D. Pape
*Assistant Examiner* — Veronica M Shull

(57) ABSTRACT

An inflatable camper skirt assembly includes a plurality of inflatable barriers. Each of the inflatable barriers has an inflation valve integrated therein to facilitate the inflatable barriers to be inflated with air. Each of the inflatable barriers is longitudinally elongated when each of the inflatable barriers is inflated with air for positioning beneath a camper. In this way each of the inflatable barriers can define a skirt extending around the camper thereby inhibiting wind from blowing beneath the camper. A plurality of deflate valves is provided and each of the deflate valves is fluidly integrated into a respective one of the inflatable barriers. Each of the deflate valves is actuatable into an open condition to deflate the respective inflatable barrier.

11 Claims, 10 Drawing Sheets

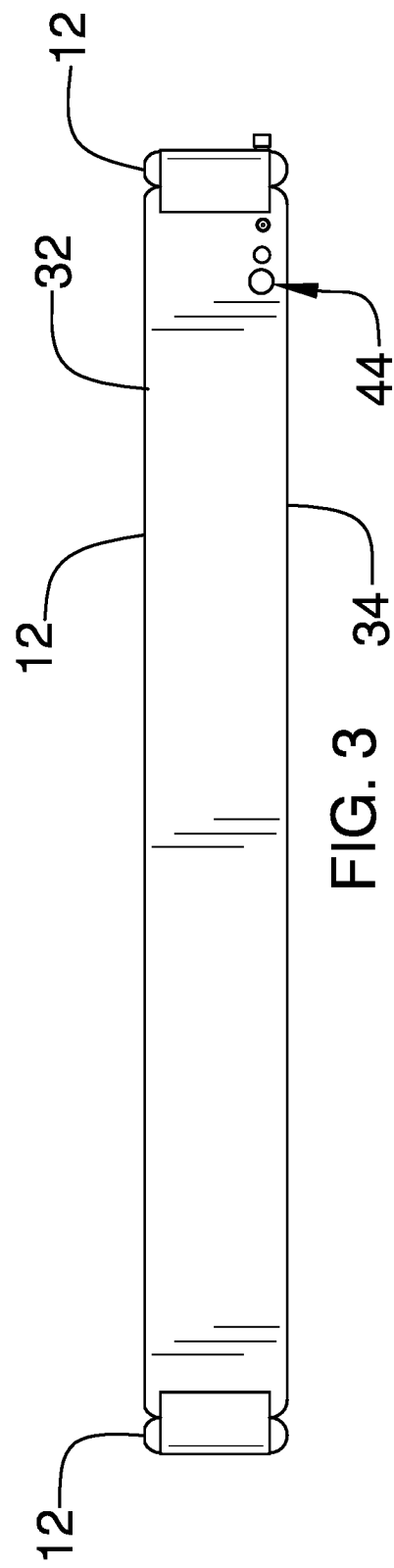
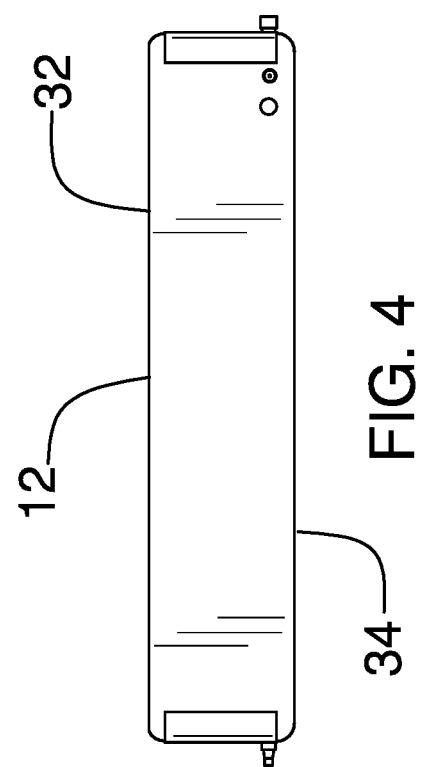

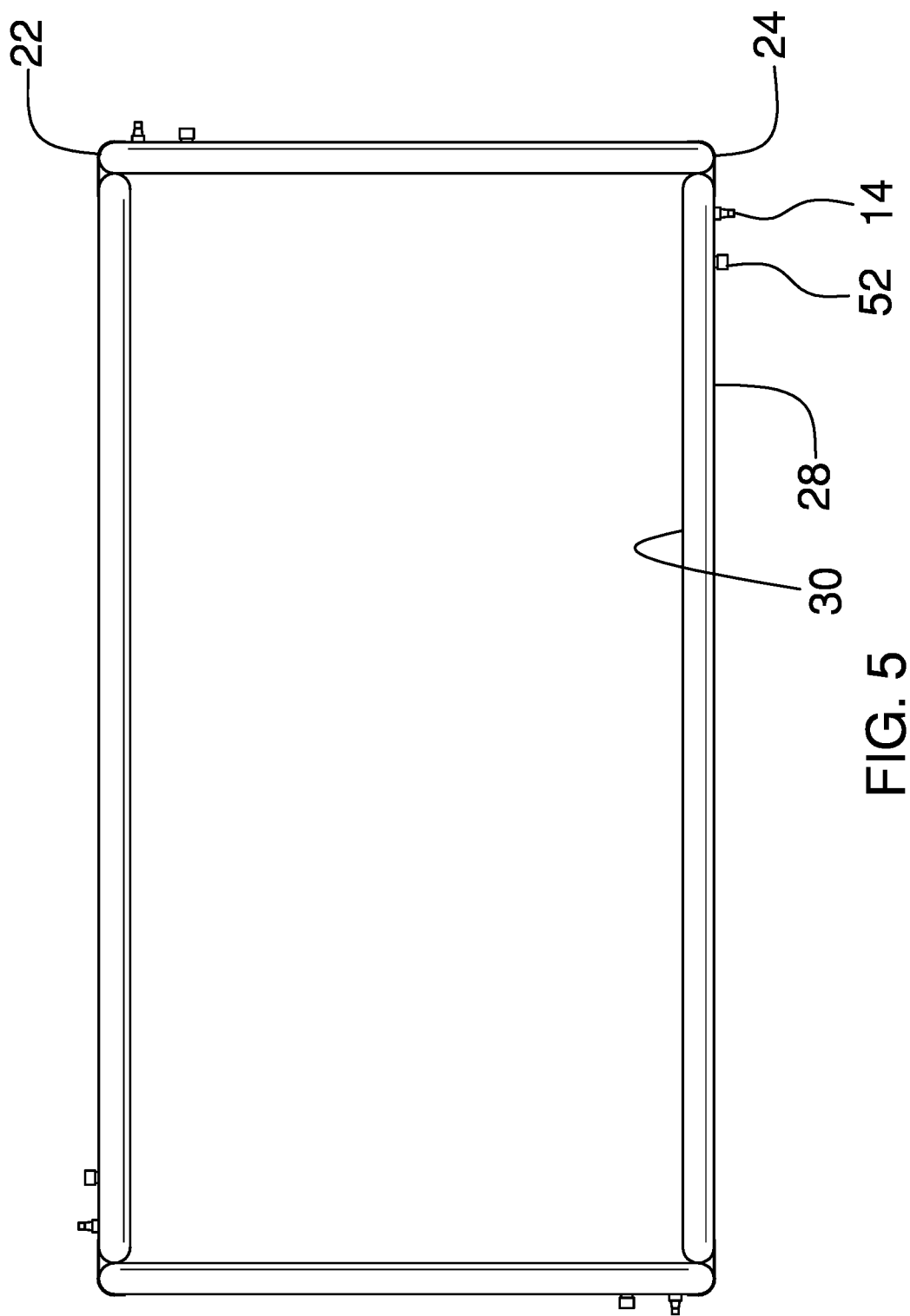

INFLATABLE CAMPER SKIRT ASSEMBLY

CROSS-REFERENCE TO RELATED APPLICATIONS

Not Applicable

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIA THE OFFICE ELECTRONIC FILING SYSTEM

Not Applicable

STATEMENT REGARDING PRIOR DISCLOSURES BY THE INVENTOR OR JOINT INVENTOR

Not Applicable

BACKGROUND OF THE INVENTION

(1) Field of the Invention

The disclosure relates to skirt devices and more particularly pertains to a new skirt device for blocking wind from blowing beneath a camper. The skirt device includes a plurality of inflatable barriers that can each be positioned around the camper. Additionally, the plurality of inflatable barriers can be removably attached together.

(2) Description of Related Art Including Information Disclosed Under 37 CFR 1.97 and 1.98

The prior art relates to skirt devices including a variety of panelized skirts for modular houses or other elevated structures. The prior art discloses a system of panels that are positionable around a camper for blocking wind from blowing beneath the camper. The prior art also discloses a retractable skirt that is mounted to a camper.

BRIEF SUMMARY OF THE INVENTION

An embodiment of the disclosure meets the needs presented above by generally comprising a plurality of inflatable barriers. Each of the inflatable barriers has an inflation valve integrated therein to facilitate the inflatable barriers to be inflated with air. Each of the inflatable barriers is longitudinally elongated when each of the inflatable barriers is inflated with air for positioning beneath a camper. In this way each of the inflatable barriers can define a skirt extending around the camper thereby inhibiting wind from blowing beneath the camper. A plurality of deflate valves is provided and each of the deflate valves is fluidly integrated into a respective one of the inflatable barriers. Each of the deflate valves is actuatable into an open condition to deflate the respective inflatable barrier.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein:

FIG. 3 is a right side view of an embodiment of the disclosure.

FIG. 4 is a front view of an embodiment of the disclosure.

FIG. 5 is a bottom view of an embodiment of the disclosure.

DETAILED DESCRIPTION OF THE INVENTION

Figure 1:
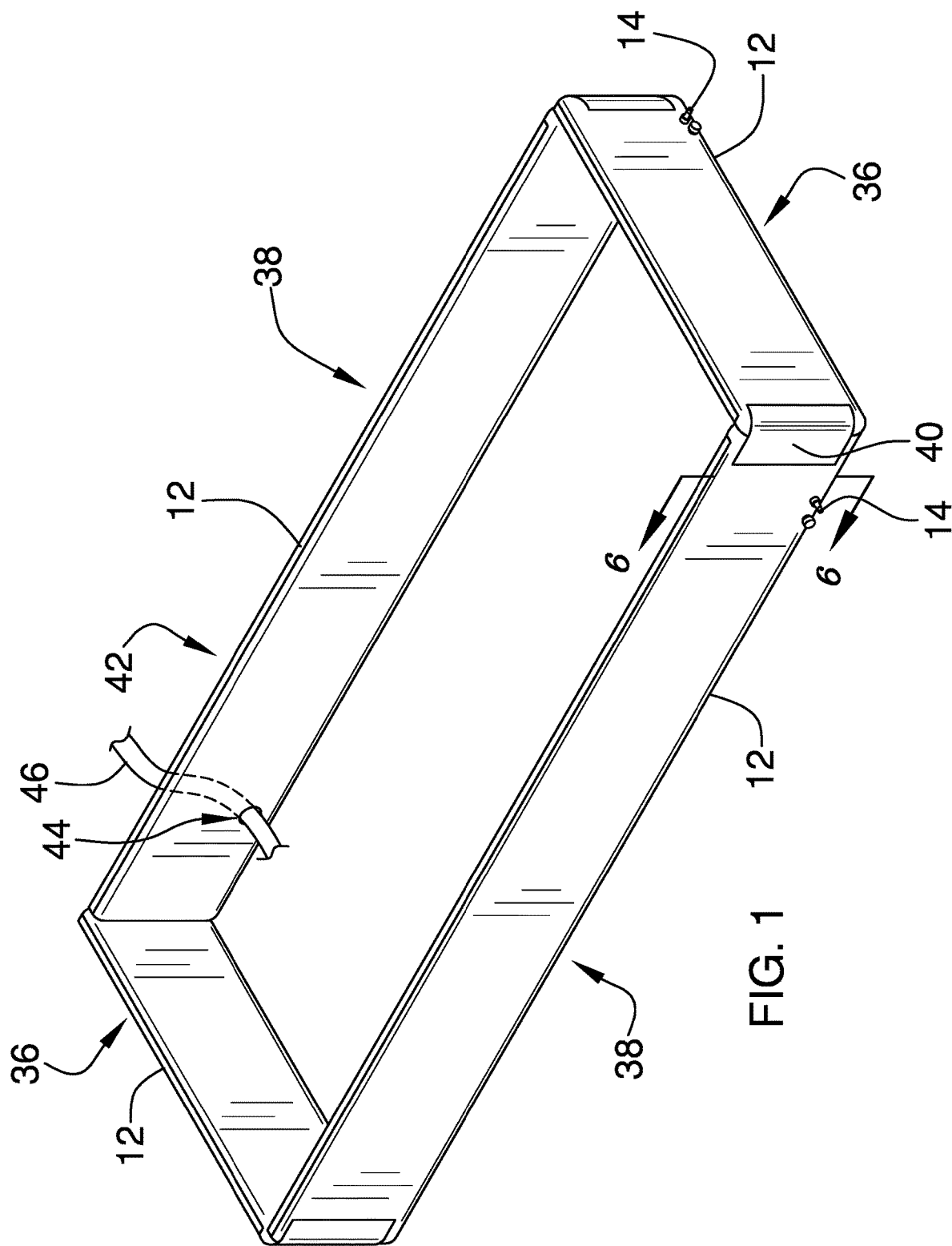
FIG. 1 is a perspective view of an inflatable camper skirt assembly according to an embodiment of the disclosure.
Figure 2:
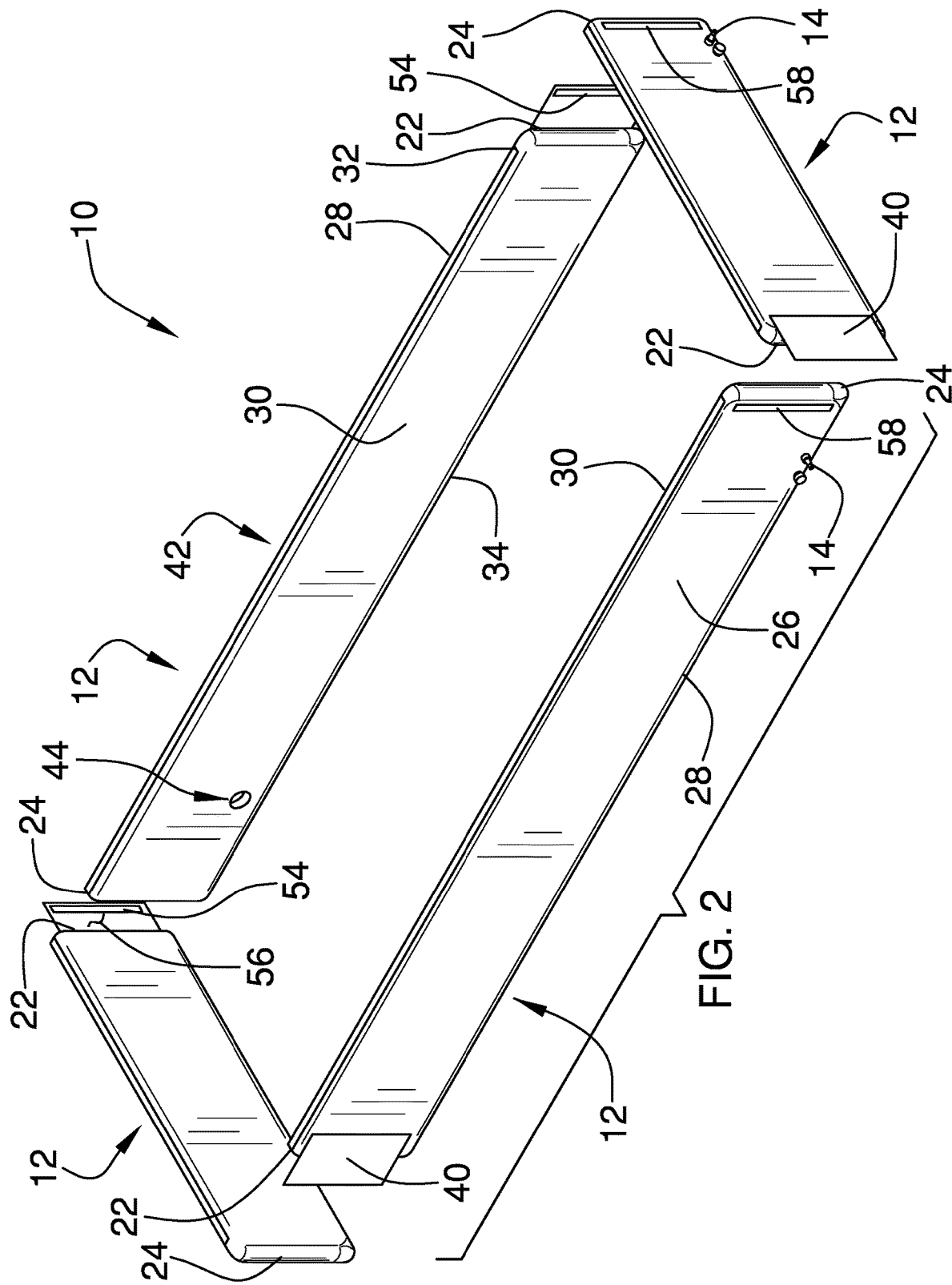
FIG. 2 is an exploded perspective view of an embodiment of the disclosure.

With reference now to the drawings, and in particular to FIGS. 1 through 11 thereof, a new skirt device embodying the principles and concepts of an embodiment of the disclosure and generally designated by the reference numeral 10 will be described.

As best illustrated in FIGS. 1 through 11, the inflatable camper skirt assembly 10 generally comprises a plurality of inflatable barriers 12 that each has an inflation valve 14 integrated therein for inflating the inflatable barriers 12 with air. Each of the inflatable barriers 12 is longitudinally elongated when each of the inflatable barriers 12 is inflated with air. In this way each of the inflatable barriers 12 can be positioned to extend along a respective side of a camper 16 to define a skirt extending around a bottom 18 of the camper 16. Thus, the inflatable barriers 12 inhibit wind from blowing beneath the camper 16 which could potentially cause water pipes to freeze.

Each of the inflatable barriers 12 is manufactured with a specific height to match the distance between the bottom 18 of the camper 16 and the ground 20. Each of the inflatable barriers 12 is manufactured with a specific length to correspond to dimensions of the camper 16. The plurality of inflatable barriers 12 may be manufactured in a variety of dimensions for accommodating a variety of makes and models of campers. The camper 16 may be a tow behind camper, a self propelled camper or any other trailer based dwelling.

Each of the plurality of inflatable barriers 12 has a first end 22, a second end 24 and an outer wall 26 extending therebetween, and the outer wall 26 has a front side 28, a back side 30, a top side 32 and a bottom side 34. The inflation valve 14 associated with each of the inflatable barriers 12 extends through the front side 28 of the outer wall 26 of the associated inflatable barrier. The inflation valve 14 associated with each of the inflatable barriers 12 facilitates air to flow in a single direction through the inflation valve 14. In this way the inflation valve 14 associated with each of the inflatable barriers 12 inhibits air inside the associated inflatable barrier from escaping through the inflation valve 14.

The plurality of inflatable barriers 12 is positionable against each other such that each of the inflatable barriers 12 defines a respective side of a rectangle. In this way the plurality of inflatable barriers 12 can conform to the perimeter of the camper 16. The plurality of inflatable barriers 12 may include a pair of short inflatable barriers 36 and a pair of long inflatable barriers 38. As is most clearly shown in FIGS. 9, 10 and 11, the plurality of inflatable barriers 12 may be manufactured in a variety of different lengths to accommodate structural features of the camper 16.

The outer wall 26 of each of the inflatable barriers 12 has a flap 40 that is integrated thereon. The flap 40 on each of the inflatable barriers 12 extends away from the first end 22 of a respective inflatable barrier 12. The flap 40 on each of the inflatable barriers 12 is wrapped onto an adjacent one of the inflatable barriers 12 when the inflatable barriers 12 are arranged to define the rectangle. Additionally, the plurality of inflatable barriers 12 includes a perforated inflatable barrier 42. The perforated inflatable barrier 42 has an opening 44 extending through the front side 28 and the back side 30 of the outer wall 26 of the perforated inflatable barrier 42 to accommodate a sewer hose 46 of the camper 16.

Figure 6:
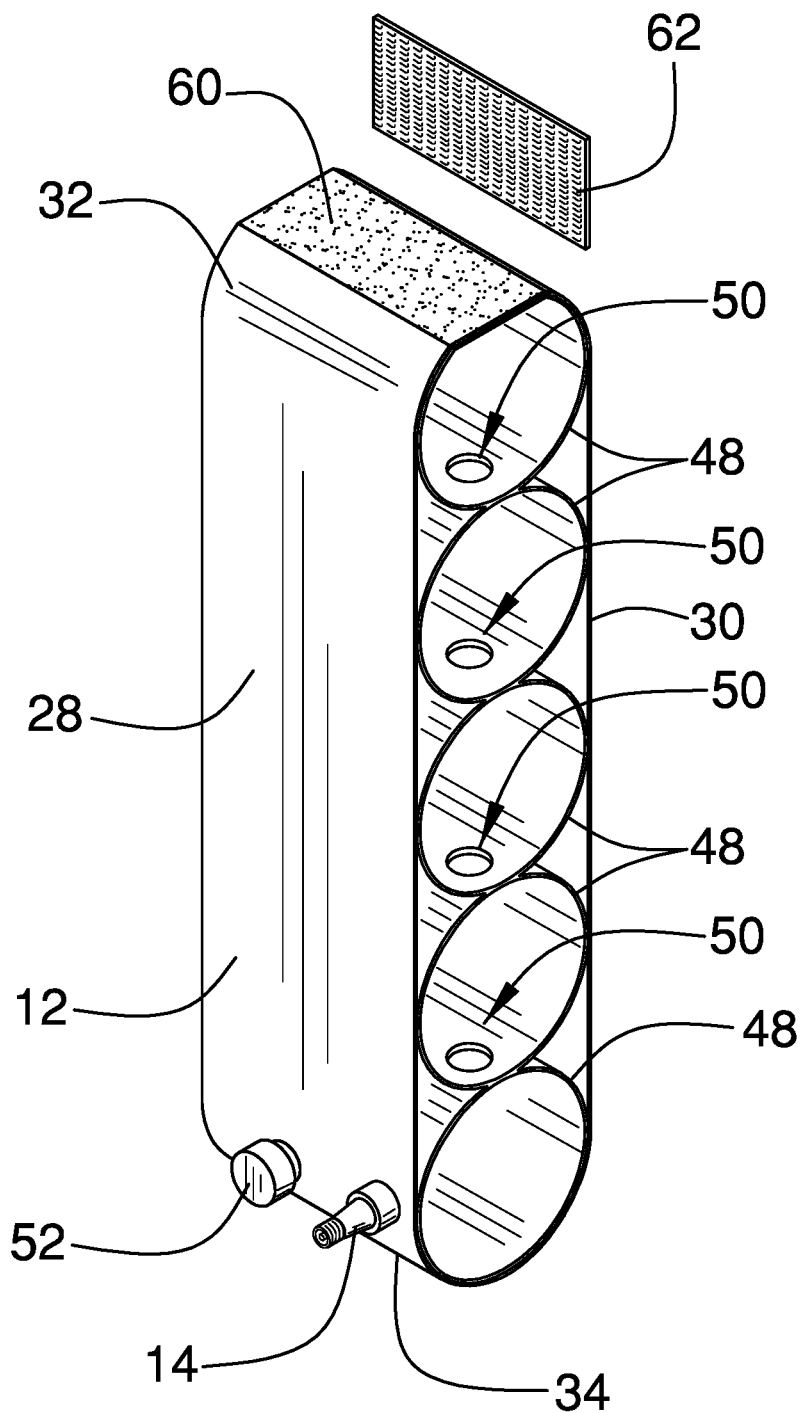
FIG. 6 is a cross sectional view taken along line 6-6 of FIG. 1 of an embodiment of the disclosure.
Figure 7A:
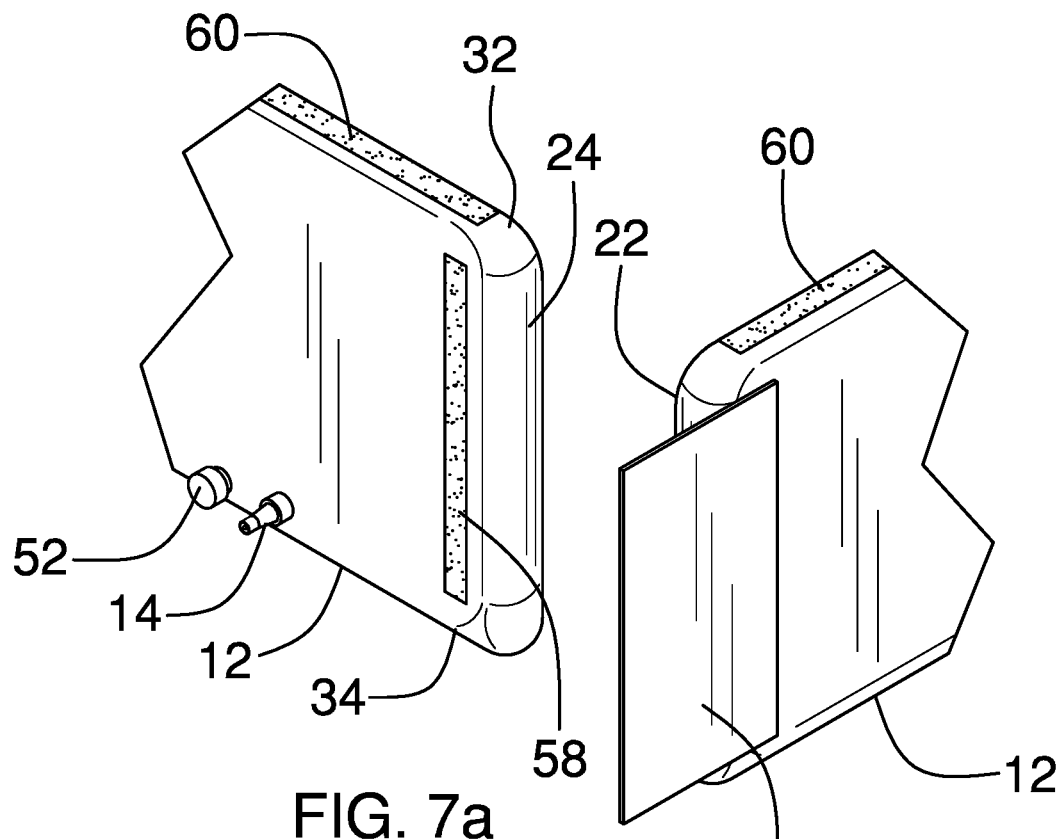
FIG. 7a is a detail view of a flap of an embodiment of the disclosure.
Figure 7B:
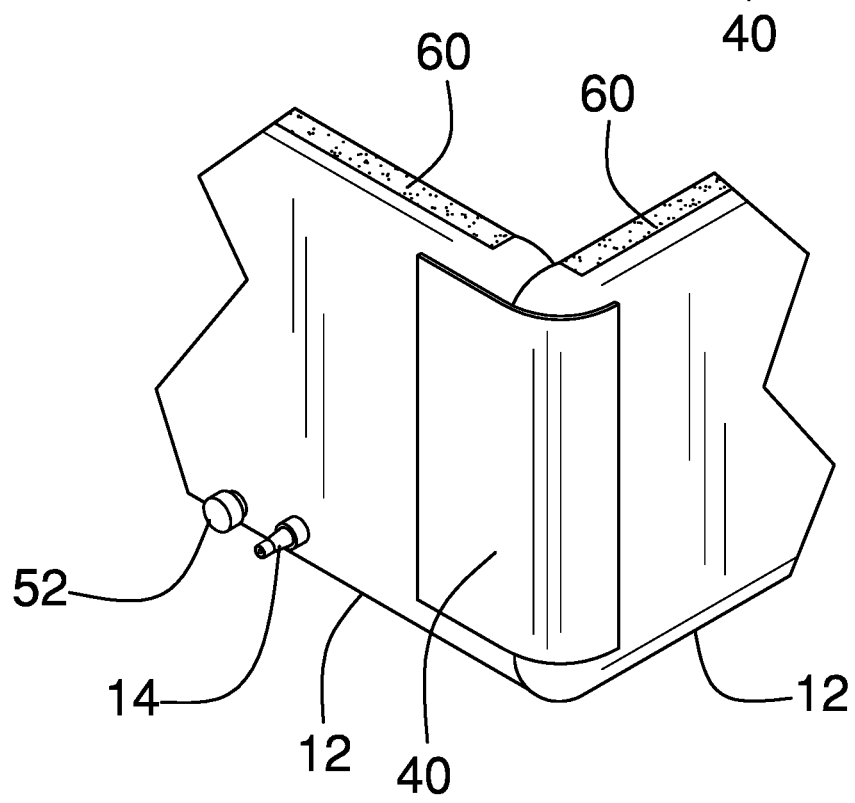
FIG. 7b is a detail view of a flap being coupled to an adjacent inflatable barrier of an embodiment of the disclosure.
Figure 8:
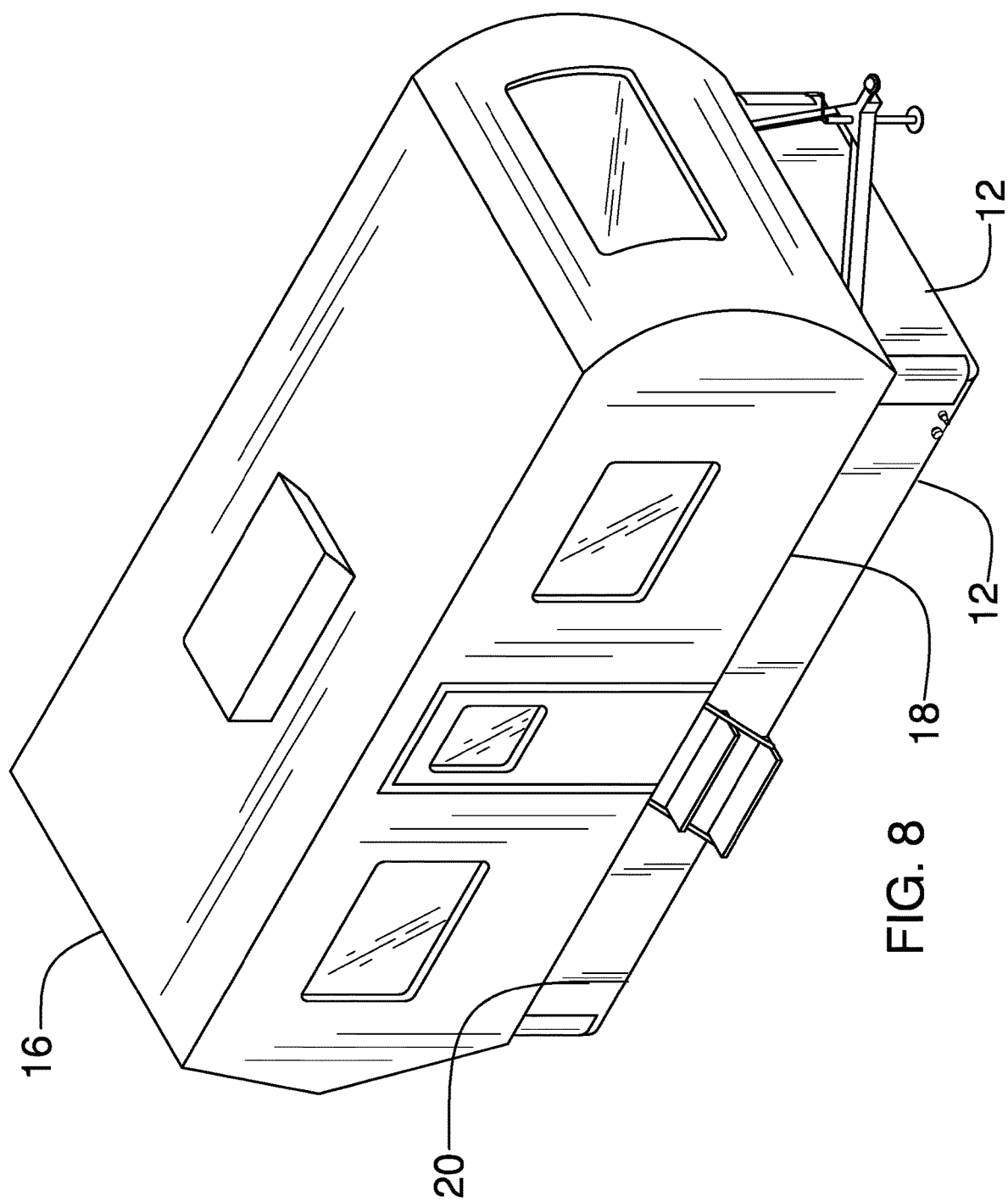
FIG. 8 is a perspective in-use view of an embodiment of the disclosure.
Figure 9:
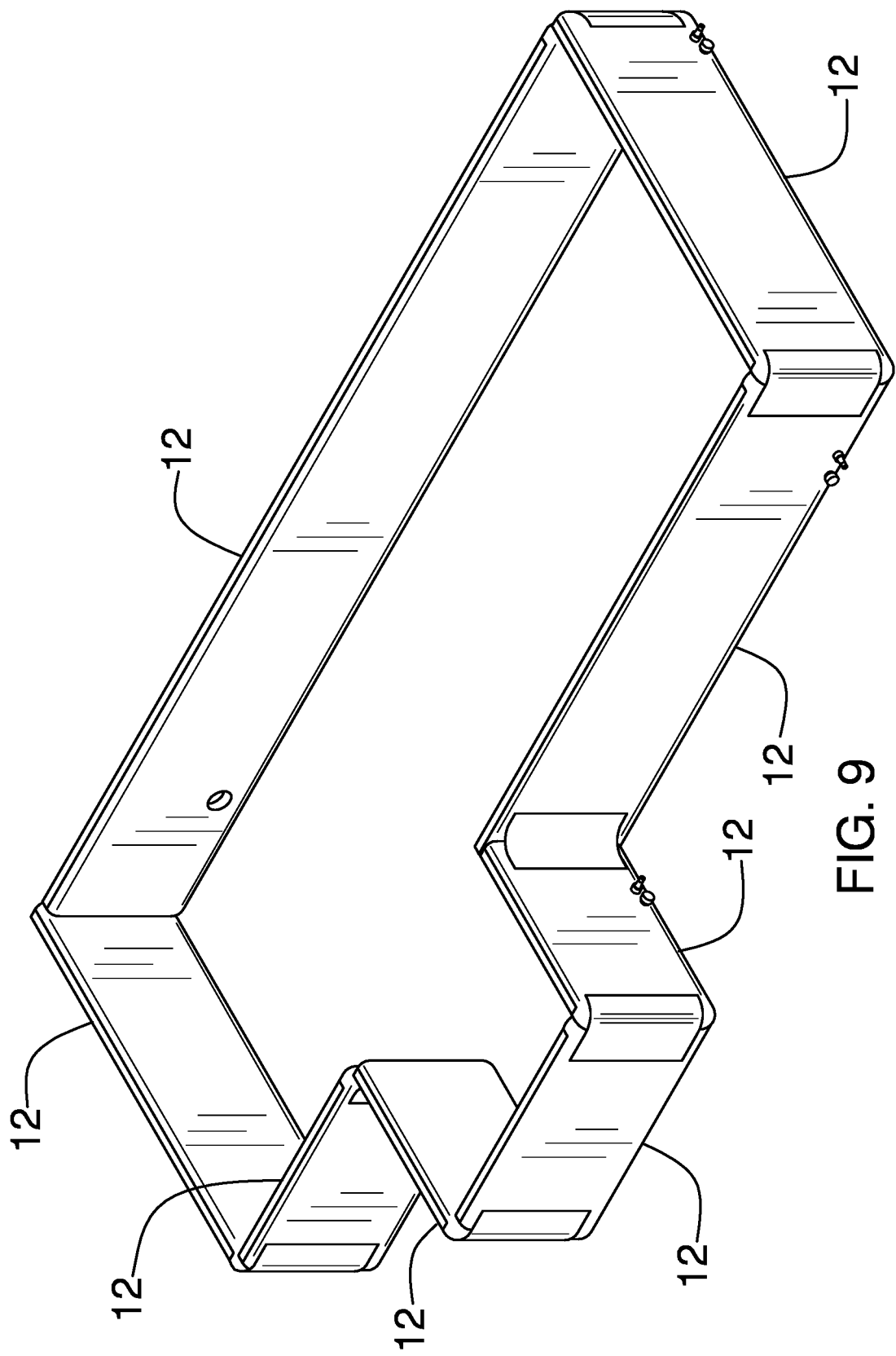
FIG. 9 is a perspective view of an alternative embodiment of the disclosure.
Figure 10:
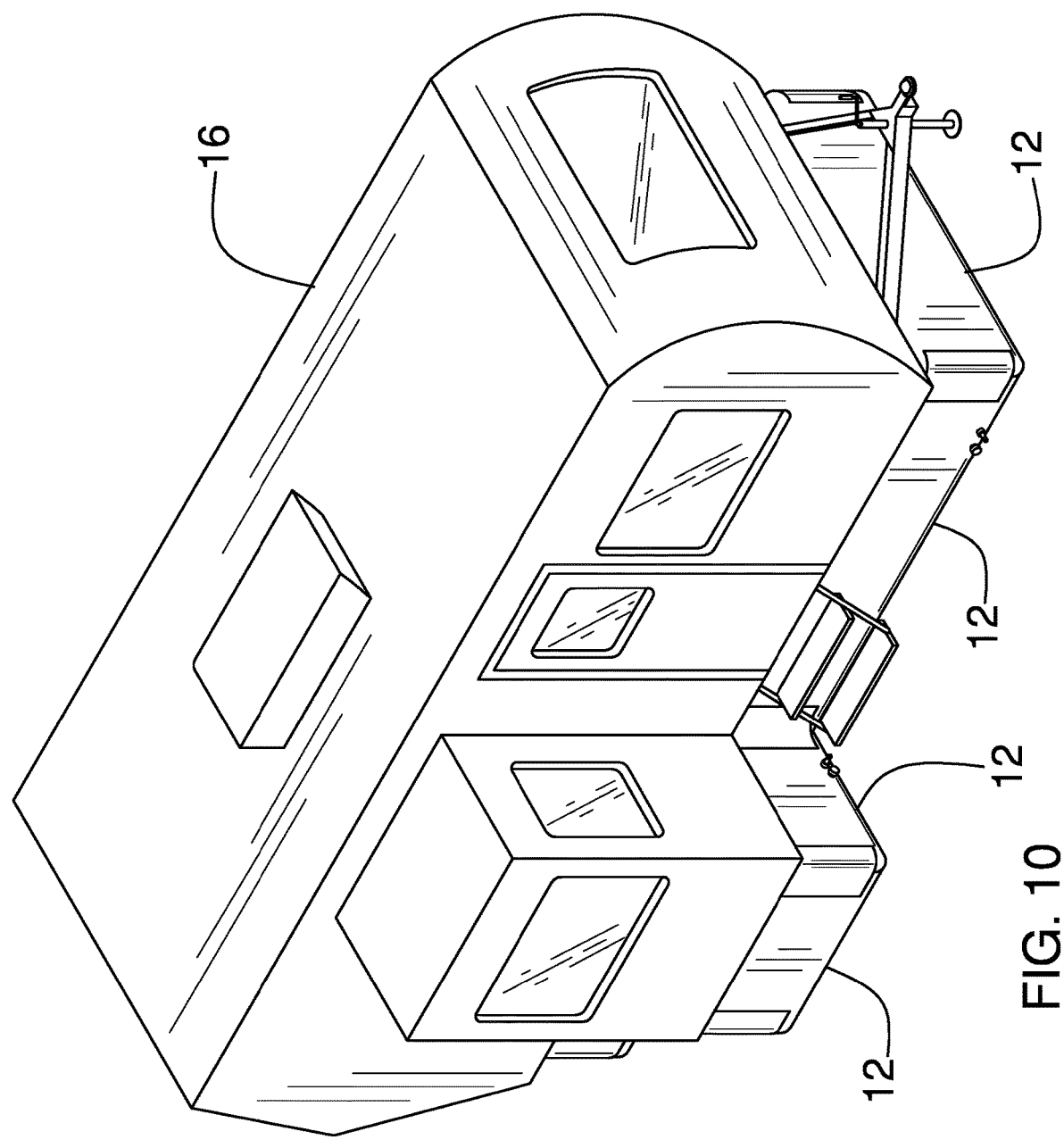
FIG. 10 is a perspective in-use view of an alternative embodiment of the disclosure.
Figure 11:
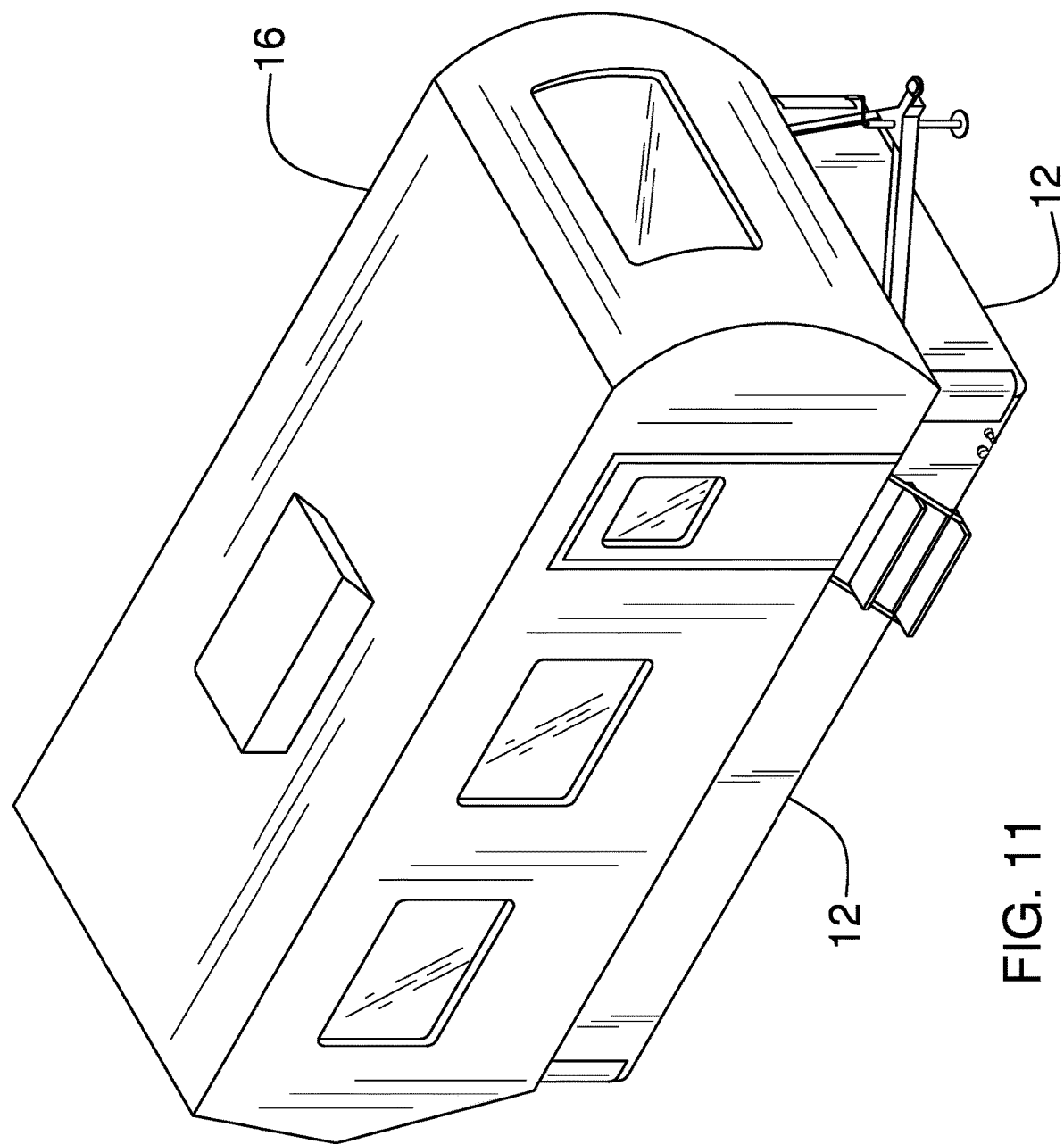
FIG. 11 is an exterior perspective in-use view of an alternative embodiment of the disclosure.

As is most clearly shown in FIG. 6, a plurality of cylinders 48 is provided and each of the cylinders 48 is positioned within a respective one of the plurality of inflatable barriers 12. The cylinders 48 in the respective inflatable barrier 12 extend between the first end 22 and the second end 24 of the respective inflatable barrier 12. Additionally, the cylinders 48 in the respective inflatable barrier 12 are distributed between the top side 32 and the bottom side 34 of the outer wall 28 of the respective inflatable barrier 12. The cylinders 48 in the respective inflatable barrier 12 have holes 50 extending therethrough such that each of the cylinders 48 is in fluid communication with each other.

A respective one of the cylinders 48 in the respective inflatable barrier 12 is in fluid communication with the inflation valve 14 on the respective inflatable barrier 12. In this way each of the cylinders 48 in the respective inflatable barrier 12 can be inflated. A plurality of deflate valves 52 is each fluidly integrated into a respective one of the inflatable barriers 12. Each of the deflate valves 52 is actuatable into an open condition to release air from within the respective inflatable barrier 12 and deflate the respective inflatable barrier 12. Each of the deflate valves 52 extends through the front side 28 of the outer wall 26 of the respective inflatable barrier 12.

A plurality of first mating members 54 is provided and each of the first mating members 54 is coupled to the flap 40 on a respective one of the inflatable barriers 12. Each of the first mating members 54 is positioned on a first surface 56 of the flap 40 on the respective inflatable barrier 12. A plurality of second mating members 58 is each coupled to the front side 28 of the outer wall 26 of a respective one of the inflatable barriers 12. Each of the second mating members 58 is positioned adjacent to the second end 24 of the respective inflatable barrier 12. The first mating member on the flap 40 of a respective one of the inflatable barriers 12 releasably engages the second mating member 58 on a respective inflatable barrier 12. In this way the inflatable barriers 12 are attached to each other to form the rectangle. Each of the first mating members 54 and each of the second mating members 58 may comprise complementary portions of a hook and loop fastener or other type of multiple use, releasable fastener.

A plurality of top mating members 60 each of the top mating members 60 is coupled to the top side 32 of the outer wall 26 of a respective one of the inflatable barriers 12. In this way each of the top mating members 60 can releasably engage the bottom 18 of the camper 16 when the inflatable barriers 12 are positioned around the camper 16. Each of the top mating members 60 extends along a full length of the top side 32 of the outer wall 26 of the respective inflatable barrier 12. Each of the top mating members 60 may comprise a hook and loop fastener or other multiple use, releasable fastener. As is most clearly shown in FIG. 6, a plurality of hook and loop fasteners 62 may have been previously installed on the bottom 18 of the camper 16 for each of the top mating members 60 to engage.

In use, each of the inflatable barriers 12 is inflated and each of the inflatable barriers 12 is positioned beneath the camper 16 to extend between the bottom 18 of the camper 16 and the ground 20. The flap 40 on each of the inflatable barriers 12 is wrapped around the adjacent inflatable barrier 12 for attaching the plurality of inflatable barriers 12 together. In this way the inflatable barriers 12 are inhibited from being dislodged from wind or the like. Additionally, the inflatable barriers 12 inhibit the wind from blowing beneath the camper 16 which could potentially cause water pipes to freeze. The inflatable barriers 12 are deflated and are detached from each other for storage.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

I claim:

1. An inflatable camper skirt assembly for positioning around a camper to inhibit wind from blowing beneath the camper, said assembly comprising:
a plurality of inflatable barriers, each of said inflatable barriers having an inflation valve being integrated therein wherein each of said inflatable barriers is configured to be inflated with air, each of said inflatable barriers being longitudinally elongated when each of said inflatable barriers is inflated with air wherein each of said inflatable barriers is configured to be positioned to extend along a respective side of a camper to define a skirt extending around the camper thereby inhibiting wind from blowing beneath the camper; and
a plurality of deflate valves, each of said deflate valves being fluidly integrated into a respective one of said inflatable barriers, each of said deflate valves being actuatable into an open condition wherein each of said deflate valves is configured to release air from within said respective inflatable barrier to deflate said respective inflatable barrier.

2. The assembly according to claim 1, wherein each of said plurality of inflatable barriers has a first end, a second end and an outer wall extending therebetween, said outer wall having a front side, a back side, a top side and a bottom side, said inflation valve associated with each of said inflatable barriers extending through said front side of said outer wall of said associated inflatable barrier, said inflation valve associated with each of said inflatable barriers facilitating air to flow in a single direction through said inflation valve wherein said inflation valve associated with each of said inflatable barriers is configured to inhibit air inside said associated inflatable barrier from escaping through said inflation valve.

3. The assembly according to claim 1, wherein said plurality of inflatable barriers is positionable against each other such that each of said inflatable barriers defines a respective side of a rectangle wherein said plurality of inflatable barriers is configured to conform to the perimeter of the camper.

4. The assembly according to claim 2, wherein said outer wall of each of said inflatable barriers has a flap being integrated thereon, said flap on each of said inflatable barriers extending away from said first end of a respective inflatable barrier, each of said flaps being wrapped onto an adjacent one of said inflatable barriers when said inflatable barriers is arranged to define a rectangle.

5. The assembly according to claim 2, wherein said plurality of inflatable barriers includes a perforated inflatable barrier, said perforated inflatable barrier having an opening extending through said front side and said back side of said outer wall of said perforated inflatable barrier wherein said opening is configured to accommodate a sewer hose of the camper.

6. The assembly according to claim 2, further comprising a plurality of cylinders, each of said cylinders being positioned within a respective one of said plurality of inflatable barriers, said cylinders in said respective inflatable barrier extending between said first end and said second end of said respective inflatable barrier, said cylinders in said respective inflatable barrier being distributed between said top side and said bottom side of said outer wall of said respective inflatable barrier.

7. The assembly according to claim 6, wherein said cylinders in said respective inflatable barrier has holes extending therethrough such that each of said cylinders is in fluid communication with each other, a respective one of said cylinders in said respective inflatable barrier being in fluid communication with said inflation valve on said respective inflatable barrier wherein each of said cylinders in said respective inflatable barrier is configured to be inflated.

8. The assembly according to claim 4, further comprising a plurality of first mating members, each of said first mating members being coupled to said flap on a respective one of said inflatable barriers, each of said first mating members being positioned on a first surface of said flap on said respective inflatable barrier.

9. The assembly according to claim 8, further comprising a plurality of second mating members, each of said second mating members being coupled to said front side of said outer wall of a respective one of said inflatable barriers, each of said second mating members being positioned adjacent to said second end of said respective inflatable barrier, said first mating member on said flap of a respective one of said inflatable barriers releasably engaging said second mating member on a respective inflatable barrier for retaining said inflatable barriers in said rectangle.

10. The assembly according to claim 2, further comprising a plurality of top mating members, each of said top mating members being coupled to said top side of said outer wall of a respective one of said inflatable barriers wherein each of said top mating members is configured to releasably engage a bottom of the camper when said inflatable barriers are positioned around the camper, each of said top mating members extending along a full length of said top side of said outer wall of said respective inflatable barrier.

11. An inflatable camper skirt assembly for positioning around a camper to inhibit wind from blowing beneath the camper, said assembly comprising:
a plurality of inflatable barriers, each of said inflatable barriers having an inflation valve being integrated therein wherein each of said inflatable barriers is configured to be inflated with air, each of said inflatable barriers being longitudinally elongated when each of said inflatable barriers is inflated with air wherein each of said inflatable barriers is configured to be positioned to extend along a respective side of a camper to define a skirt extending around the camper thereby inhibiting wind from blowing beneath the camper, each of said plurality of inflatable barriers having a first end, a second end and an outer wall extending therebetween, said outer wall having a front side, a back side, a top side and a bottom side, said inflation valve associated with each of said inflatable barriers extending through said front side of said outer wall of said associated inflatable barrier, said inflation valve associated with each of said inflatable barriers facilitating air to flow in a single direction through said inflation valve wherein said inflation valve associated with each of said inflatable barriers is configured to inhibit air inside said associated inflatable barrier from escaping through said inflation valve, said plurality of inflatable barriers being positionable against each other such that each of said inflatable barriers defines a respective side of a rectangle wherein said plurality of inflatable barriers is configured to conform to the perimeter of the camper, said outer wall of each of said inflatable barriers having a flap being integrated thereon, said flap on each of said inflatable barriers extending away from said first end of a respective inflatable barrier, each of said flaps being wrapped onto an adjacent one of said inflatable barriers when said inflatable barriers is arranged to define said rectangle, said plurality of inflatable barriers including a perforated inflatable barrier, said perforated inflatable barrier having an opening extending through said front side and said back side of said outer wall of said perforated inflatable barrier wherein said opening is configured to accommodate a sewer hose of the camper;

a plurality of cylinders, each of said cylinders being positioned within a respective one of said plurality of inflatable barriers, said cylinders in said respective inflatable barrier extending between said first end and said second end of said respective inflatable barrier, said cylinders in said respective inflatable barrier being distributed between said top side and said bottom side of said outer wall of said respective inflatable barrier, said cylinders in said respective inflatable barrier having holes extending therethrough such that each of said cylinders is in fluid communication with each other, a respective one of said cylinders in said respective inflatable barrier being in fluid communication with said inflation valve on said respective inflatable barrier wherein each of said cylinders in said respective inflatable barrier is configured to be inflated;

a plurality of deflate valves, each of said deflate valves being fluidly integrated into a respective one of said inflatable barriers, each of said deflate valves being actuatable into an open condition wherein each of said deflate valves is configured to release air from within said respective inflatable barrier to deflate said respective inflatable barrier, each of said deflate valves extending through said front side of said outer wall of said respective inflatable barrier;

a plurality of first mating members, each of said first mating members being coupled to said flap on a respective one of said inflatable barriers, each of said first mating members being positioned on a first surface of said flap on said respective inflatable barrier;

a plurality of second mating members, each of said second mating members being coupled to said front side of said outer wall of a respective one of said inflatable barriers, each of said second mating members being positioned adjacent to said second end of said respective inflatable barrier, said first mating member on said flap of a respective one of said inflatable barriers releasably engaging said second mating member on a respective inflatable barrier for retaining said inflatable barriers in said rectangle; and a plurality of top mating members, each of said top mating members being coupled to said top side of said outer wall of a respective one of said inflatable barriers wherein each of said top mating members is configured to releasably engage a bottom of the camper when said inflatable barriers are positioned around the camper, each of said top mating members extending along a full length of said top side of said outer wall of said respective inflatable barrier.

* * * * *